United States Patent
Bonnasse-Gahot et al.

(10) Patent No.: US 6,312,750 B1
(45) Date of Patent: Nov. 6, 2001

(54) SWEET SNACK

(75) Inventors: Sabine Bonnasse-Gahot, La Tour-de-Peilz; Adrienne S. Jones-Wiltshire, Pully; Werner Pfaller, Orbe; Francois Diaz, Lausanne; Pierre Felix Fourre, Yverdon-les-Bains, all of (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/432,964

(22) Filed: Nov. 3, 1999

(30) Foreign Application Priority Data

Nov. 3, 1998 (EP) .................................................. 98203697

(51) Int. Cl.7 .................................................... A21D 13/00
(52) U.S. Cl. ...................... 426/559; 426/560; 426/549; 426/94; 426/516; 426/445; 426/808
(58) Field of Search ..................... 426/516, 808, 426/445, 446, 549, 391, 496, 497, 94, 448, 449, 450, 559, 560, 661

(56) References Cited

U.S. PATENT DOCUMENTS

| | | | |
|---|---|---|---|
| 4,374,660 | 2/1983 | Gasser et al. | 426/28 |
| 4,438,146 * | 3/1984 | Colby et al. | 426/448 |
| 4,650,685 | 3/1987 | Persson et al. | 426/285 |
| 4,970,086 * | 11/1990 | Best | 426/564 |
| 5,035,906 | 7/1991 | Persson et al. | 426/285 |
| 5,176,936 * | 1/1993 | Creighton et al. | 426/618 |
| 5,340,598 * | 8/1994 | Hay, Jr. et al. | 426/496 |
| 5,395,623 | 3/1995 | Kovach | 426/285 |
| 5,523,106 * | 6/1996 | Gimmler et al. | 426/549 |

FOREIGN PATENT DOCUMENTS

| | | |
|---|---|---|
| 0 113 056 | 11/1983 | (EP) . |
| 0 188 398 | 7/1986 | (EP) . |
| 94/22328 | 10/1994 | (WO) . |

* cited by examiner

Primary Examiner—Milton I. Cano
Assistant Examiner—Robert Madsen
(74) Attorney, Agent, or Firm—Winston & Strawn

(57) ABSTRACT

Cooked-extruded-expanded sweet snack having a porous texture, a low specific weight and a biscuit and caramel flavor. The snack includes non-fat milk solids, an oil or fat, hydrolyzed amylaceous material having a DE of from 5 to 45, and optionally, non hydrolyzed amylaceous material, a sugar or a phosphate. The snack has a diameter of 10 to 20 mm, a length of 30 to 100 mm, or both, and can be coated with a chocolate or sugar coatings.

11 Claims, No Drawings

SWEET SNACK

TECHNICAL FIELD

The present invention relates to a cooked-extruded-expanded sweet snack and to a process for manufacturing such a sweet snack.

BACKGROUND ART

U.S. Pat. No. 4,650,685 (Persson et al.) discloses a biscuit comprising agglomerated granules of a cooked-extruded base coated with a binder, the base comprising from 40 to 80 parts by weight of cereal flour, up to 20 parts sucrose and from 0.5 to 3 parts of oil or fat, and the binder comprising from 8 to 30 parts by weight of sucrose and/or mixtures of glucose and its polymers.

SUMMARY OF THE INVENTION

The present invention relates to a cooked-extruded-expanded sweet snack comprising an amylaceous material, milk solid non-fat and an oil or fat, which has a fine, porous, light, melt-in the mouth texture with a biscuit/caramel flavour, which is attractive in shape and taste, and which may be coated with chocolate.

To this end, the present cooked-extruded-expanded sweet snack has a porous texture, a specific weight of from about 80 to 200 g/l and a biscuit and caramel flavor, and it comprises, in percent by weight of the snack, from about 5 to 15% of non-fat milk solids, from about 4 to 8% of oil or fat, from about 35 to 75% of a hydrolyzed amylaceous material having a DE of from about 5 to 45, up to about 40% of a non-hydrolyzed amylaceous material, and from about 1 to 3% of residual water. Optionally, from about 5 to 15% of sugar and from about 0.5 to 1.5% of a phosphate can be included.

The invention also relates to a process for manufacturing a sweet snack. The process includes the steps of cooking-extruding-expanding at a temperature of about 100 to 165° C. under a pressure of about 20 to 40 bar for a time of about 5 to 50 sec a mixture comprising, in parts by weight, from about 5 to 15 parts of non-fat milk solids, from about 4 to 8 parts of oil or fat, from about 35 to 75 parts of a hydrolyzed amylaceous material having a DE of from about 5 to 45, up to about 40 parts of a non-hydrolyzed amylaceous material, and added water up to a water content of from about 5 to 10% by weight of the mixture, thus obtaining a rope of a thermoplastic mass having a porous texture, cooling the rope to solidify it and then cutting it into pieces. Optionally, from about 5 to 15 parts of sugar and from about 0.5 to 1.5 parts of a phosphate can be included in the mixture.

DETAILED DESCRIPTION OF THE INVENTION

The terms "cooked" or "cooking" in the expressions "cooked-extruded-expanded" or "cooking-extruding-expanding" is to be understood in the present context as meaning "heated and/or cooked" or "heating and/or cooking" depending on whether the whole amylaceous material of the starting mixture is already cooked or at least a part of it is not yet cooked.

The present sweet snack thus comprises non-fat milk solids, oil or fat, hydrolyzed amylaceous material having a DE of from about 5 to 45, and, optionally non-hydrolyzed amylaceous material, sugar, bisodium phosphate and residual water.

The non-fat milk solids may be a powdered milk such as powdered skimmed milk. The oil or fat may be any vegetable oil or fat or butter oil. Preferably, the fat or oil is present in an amount to act as a lubricating agent in the cooking-extrusion process.

The hydrolyzed amylaceous material having a DE (dextrose equivalent) of from about 5 to 45 may be a flour or even a starch of a cereal or mixture of cereals such as wheat, barley, rice and/or corn which have been cooked and then partially hydrolyzed by alpha and/or beta amylases so that it contains a relatively high amount of glucose and its polymers.

An advantageous process for obtaining such a hydrolyzed amylaceous material in dehydrated, powdered form is disclosed in U.S. Pat. No. 4,374,860.

The non-hydrolyzed amylaceous material, when used, may be a raw flour or even a native starch of a cereal or mixture of cereals such as wheat, barley, rice and/or corn and is present in an amount of about 10 to 35% by weight. It preferably is wheat flour in an amount of from about 14 to 22%.

The sugar may be saccharose and/or dextrose. It preferably is a mixture from about 5 to 15% of saccharose and up to about 10% of dextrose.

In the present product, any food grade phosphate can be used. Preferably, the phosphate is sodium biphosphate and is present in an amount to act as a stabilizer (antioxidant) during storage.

The biscuit and caramel flavor of the present product is most likely due to caramelization and Maillard reactions occurring during cooking-extrusion-expansion of a mixture of the non-fat milk solids, oil or fat, hydrolyzed amylaceous material having a DE of from about 5 to 45. Similar reactions are also observed when the optional components are present in the mixture. The mixture especially comprises added water up to a water content of from about 5 to 10%. Such a water content is adequate for obtaining a correct expansion after cooking-extruding the mixture.

For carrying out the present process for manufacturing a sweet snack, a mixture having the composition indicated above may be prepared by first mixing together powdery components to obtain a dry mix and then mixing together the dry mix and liquid or fluid components, such as in a first mixing section of an extruder. For this embodiment, the mixture may be cooked in subsequent sections of the extruder where the mixture is heated, compressed and sheared so that it forms a cooked thermoplastic mass.

The thermoplastic mass may be extruded by having it pushed by an extruder screw or twin screw through the openings of a die provided for at an end of the extruder. The thermoplastic mass may be expanded by extruding it through the die into an open space at ambient temperature and at atmospheric pressure.

For carrying out these cooking-extruding-expanding steps, any traditional food extruder may be used, although a twin screw extruder is preferred.

Preferably, a rather large screw length of from about 800 to about 1200 mm is chosen in order to provide an adequate residence time of from about 5 to 50 seconds.

Preferably, from four to possibly about six barrel heating zones are utilized to cook the mixture in stages.

In a first zone, the screw configuration may be relatively large (i.e., a screw pitch of 45 to 85 mm and typically 50 mm) that the components of the mixture are simply mixed together and transported into the next zone.

In further zones, namely in from a second to up to a sixth zone, the screw configuration may be relatively small (i.e., a screw pitch of 10 to 40 mm and typically 32 mm) that the mixture is simultaneously transported and kneaded. The barrel heating may be set within a temperature range of from about 65 to 90° C. for a second zone, it may be set within a range of from about 100° C. to 120° C. for a third zone and within a range of from about 130° C. to 165° C., for a fourth zone. Optionally, fifth and sixth zones can be used, with the temperature being in the same range as the third zone or slightly higher if further cooking is desired.

In the last zone, the screw configuration is also relatively small, (i.e., a screw pitch of 32 mm) that the cooked and kneaded mixture is further kneaded and compressed in order to be pushed through the openings of a die provided for after the end of the screw or twin screw, and the barrel heating may be set within a temperature range of from about 130° C. to 165° C.

The die may have one or more circular openings having of from about 2 to 10 mm in diameter. The die openings may also have different configurations such as polygons or fancy shapes such as stars, hearts, clovers or diamonds.

In a preferred embodiment of the present process, compressed inert gas such as nitrogen is injected into the plastified mass just before extruding it. Nitrogen injection may be carried out under a pressure of from about 20 to 40 bar, at a rate of from about 0.1 to 0.6 g nitrogen per kg of mass.

Most surprisingly, the cooked-extruded thermoplastic mass does not expand to a greater degree under the effect of this nitrogen injection, but on the contrary to a lesser degree. This is because the injected nitrogen not only increases the number of bubbles within the expanded rope of cooked-extruded thermoplastic mass but also cools down the mass before it is extruded. A fine porous texture may be obtained in this way which stands in contrast with a rather coarse porous texture which may be obtained without nitrogen injection.

For carrying out this preferred embodiment, the screw configuration in the last zone may also comprise mixing discs, bilobes or a block of bilobes.

The present sweet snack preferably has a rather large and attractive shape such as a stick of from about 30 to 100 mm in length, a sphere having a diameter of from about 10 to 20 mm or a finger-biscuit in the form of cylinder having a diameter of 10 to 20 mm and a length of from about 30 to 100 mm.

The present sweet snack may be partly or totally coated with any coating, especially with a white or milk/brown chocolate coating, or a sugar based coating. It preferably is coated with from about 60 to 80 parts, especially from about 68 to 77 parts of chocolate, in parts per 100 parts of coated snack.

The present snack may be conditioned in a packing providing for its protection against humidity, such as a packing made of a film with aluminum foil.

EXAMPLES

The following examples are given as illustration of embodiments of the sweet snack and embodiments of the process for its manufacture according to the present invention. The parts and percentages are by weight.

Example 1

For manufacturing a sweet snack having a stick shape which is to be eaten as a finger-biscuit, a mixture was prepared which had the following composition, in parts by weight (except added water):

| | |
|---|---|
| Skimmed milk powder | 12.37 |
| Bisodium phosphate | 1.00 |
| Hydrolyzed wheat flour (DE 5–10) | 31.94 |
| Hydrolyzed wheat flour (DE 30–35) | 39.68 |
| Crystal sugar | 9.94 |
| Butter oil | 5.07 |
| Added water, up to a water content of the mixture of | 6% |

For preparing the mixture, the powders were first mixed together to obtain a dry mix.

The dry mix, oil and added water were then mixed together in a first zone of a BC-45 type CLEXTRAL twin screw extruder.

This extruder had a screw diameter of 55.5 mm, a total processing length of 1200 mm, 6 barrel heating zones and a die made of a thick metal plate in which four cylindrical holes were bored defining four circular openings 2.5 mm in diameter. The screw speed was set to 270 rpm.

In the first zone, the screw pitch was 50 mm in length, the components of the mixture were simply mixed together and transported to the next zone.

In a second zone, the screw pitch was of 32 mm, the barrel heating was set to a temperature of from 70 to 90° C. and the mixture was simultaneously heated up, transported and kneaded.

In a third zone, the screw pitch was of 32 mm, the barrel heating was set to a temperature of from 110 to 120° C., and the mixture was simultaneously further heated up, transported and kneaded.

In a fourth, a fifth and a sixth zone, the plastified mass or mixture was heated and/or cooked while being simultaneously transported and kneaded under a pressure of about 30 bar, the barrel heatings being set to a temperature of from 135 to 155° C.

In the fourth and the fifth zones, the screw pitch was 32 mm.

The sixth zone was divided into two successive parts.

In the first part the screw configuration comprised mixing discs. In the middle of this first part, nitrogen was injected under a pressure of about 20 bar into the plastified mass at a rate of about 0.3 g of nitrogen per kg of mass.

In the second part of the sixth zone, the screw pitch was of 32 mm.

At the end of the sixth zone the hot plastic mass was compressed to about 30 bar and pushed through the die into a free open space at atmospheric pressure and ambient temperature, where the extruded still thermoplastic mass expanded to an expansion degree of about 2.

The rope of cooked-extruded-expanded thermoplastic mass was then cooled down rapidly in order to solidify. It was cut into pieces or sticks about 60 mm in length.

The sweet snacks thus obtained had a specific weight of 80 to 100 g/l and a very fine, porous, light, melt-in the mouth texture with a biscuit/caramel flavor.

Example 2

For manufacturing a sweet snack having a stick shape which is to be eaten as a finger-biscuit, a mixture was prepared which had the following composition, in parts by weight (except added water):

| | |
|---|---|
| Skimmed milk powder | 12.37 |
| Bisodium phosphate | 1.00 |
| Hydrolyzed wheat flour (DE 5–10) | 36.70 |
| Hydrolyzed wheat flour (DE 40–45) | 34.92 |
| Crystal sugar | 9.94 |
| Butter oil | 5.07 |
| Added water, up to a water content of the mixture of | 6% |

For preparing the mixture, the powders were first mixed together to obtain a dry mix.

The dry mix, oil and added water were then mixed together in a first zone of a BC-45 type CLEXTRAL twin screw extruder.

The mixture was cooked-extruded-expanded as disclosed in Example 1.

The rope of cooked-extruded-expanded thermoplastic mass thus obtained was then cooled down in order to solidify. It was cut into pieces or sticks about 60 mm in length.

The sweet snack thus obtained had a specific weight of 80 to 100 g/l and it was then coated with a brown chocolate coating, at a rate of 77 parts chocolate per 100 parts of coated snack. It had a very fine, porous, light, melt-in the mouth texture with a biscuit/caramel/chocolate flavor.

Example 3

A chocolate coated snack was prepared as illustrated in Example 2 except the following differences:

A mixture was prepared which had the following composition, in parts by weight (except added water):

| | |
|---|---|
| Skimmed milk powder | 5.0 |
| Bisodium phosphate | 1.0 |
| Hydrolyzed wheat flour (DE 35–40) | 49.0 |
| Wheat flour | 22.0 |
| Crystal sugar | 10.0 |
| Dextrose | 5.0 |
| Butter oil | 5.0 |
| Added water, up to a water content of the mixture of | 6% |

In the first part of the sixth zone the screw configuration comprised block bilobes.

The sweet snack thus obtained had a specific weight of 80 to 100 g/l and it was then coated with a brown chocolate coating, at a rate of 68 parts chocolate per 100 parts of coated snack. It had a very fine, porous, light, melt-in the mouth texture with a biscuit/caramel/chocolate flavor.

Example 4

A chocolate coated snack was prepared as illustrated in Example 2 except the following differences:

A mixture was prepared which had the following composition, in parts by weight (except added water):

| | |
|---|---|
| Skimmed milk powder | 10.0 |
| Bisodium phosphate | 1.0 |
| Hydrolyzed wheat flour (DE 35–40) | 44.0 |
| Wheat flour | 27.0 |
| Crystal sugar | 10.0 |
| Butter oil | 5.0 |
| Added water, up to a water content of the mixture of | 6% |

In the first part of the sixth zone the screw configuration comprised block bilobes.

The sweet snack thus obtained had a specific weight of 80 to 100 g/l and it was then coated with a brown chocolate coating, at a rate of 71 parts chocolate per 100 parts of coated snack. It had a very fine, porous, light, melt-in the mouth texture with a biscuit/caramel/chocolate flavor.

What is claimed is:

1. A cooked-extruded-expanded sweet snack comprising, in percent by weight of the snack, about 5 to 15% of non-fat milk solids, about 4 to 8% of an oil or fat, about 35 to 75% of hydrolyzed amylaceous material having a DE of about 5 to 45, up to about 40% of non-hydrolyzed amylaceous material, wherein the sweet snack has been cooked, extruded, and expanded, has about 1 to 3% of residual water immediately after it is extruded and cooled, and has a porous texture and a caramel flavor.

2. A sweet snack as claimed in claim 1, in which the non hydrolyzed amylaceous material is a raw flour or a native starch of wheat, barley, rice and/or corn and is present in an amount of about 10 to 35%.

3. A sweet snack as claimed in claim 1, in which the non hydrolyzed amylaceous material is wheat flour and is present in an amount from 14 to 22% by weight of the sweet snack.

4. A sweet snack as claimed in claim 1, further comprising from about 5 to 15% of sugar by weight.

5. A sweet snack as claimed in claim 4, in which the sugar is in the saccharose or dextrose.

6. A sweet snack as claimed in claim 5, in which the sugar is a mixture of from about 5 to 15% of saccharose and up to about 10% of dextrose.

7. A sweet snack as claimed in claim 4, in which the phosphate is present as sodium biphosphate.

8. A sweet snack as claimed in claim 1, which is coated with from about 60 to 80 parts of a chocolate or sugar coating per 100 parts of coated snack.

9. A sweet snack as claimed in claim 1, having a length of between 30 and 100 mm.

10. A sweet snack as claimed in claim 1, in the shape of a sphere, having a diameter of 10 to 20 mm.

11. A sweet snack as claimed in claim 1, further comprising from about 0.5 to 1.5% by weight of a phosphate.

* * * * *